United States Patent [19]

Adcock et al.

[11] 4,258,452
[45] Mar. 31, 1981

[54] FISH SCALER

[76] Inventors: Michael R. Adcock; Charles D. Ditmars, both of 567 Houston St., Mobile, Ala. 36606

[21] Appl. No.: 70,419

[22] Filed: Aug. 28, 1979

[51] Int. Cl.³ ............................................ A22C 25/02
[52] U.S. Cl. .......................................... 17/51; 17/66
[58] Field of Search .................. 17/64, 65, 66, 67, 51, 17/47, 45, 13, 18

[56] References Cited
U.S. PATENT DOCUMENTS

| 2,172,471 | 9/1939 | Grow | 17/64 |
| 2,720,002 | 10/1955 | Waters | 17/67 X |
| 2,884,658 | 5/1959 | Johnson | 17/67 |
| 3,667,086 | 6/1972 | Sexton | 17/66 |

Primary Examiner—Willie G. Abercrombie
Attorney, Agent, or Firm—Burns, Doane, Swecker & Mathis

[57] ABSTRACT

A method and apparatus for scaling a fish by hand is disclosed wherein the apparatus includes a handle and a scraping element connected to the handle. The scraping element includes at least one row of serrated teeth projecting from a surface of the scraping element. A relatively large water conducting tube is fixed with respect to the handle. At least one relatively small tube projects from the relatively large water conducting tube and is positioned on the scraping element adjacent to the at least one row of serrated teeth. The relatively small tube includes a plurality of angled holes from each of which a jet of water issues to wash the fish being scaled. A valve in the relatively large water conducting tube permits a user to regulate a flow of water through the large tube.

21 Claims, 10 Drawing Figures

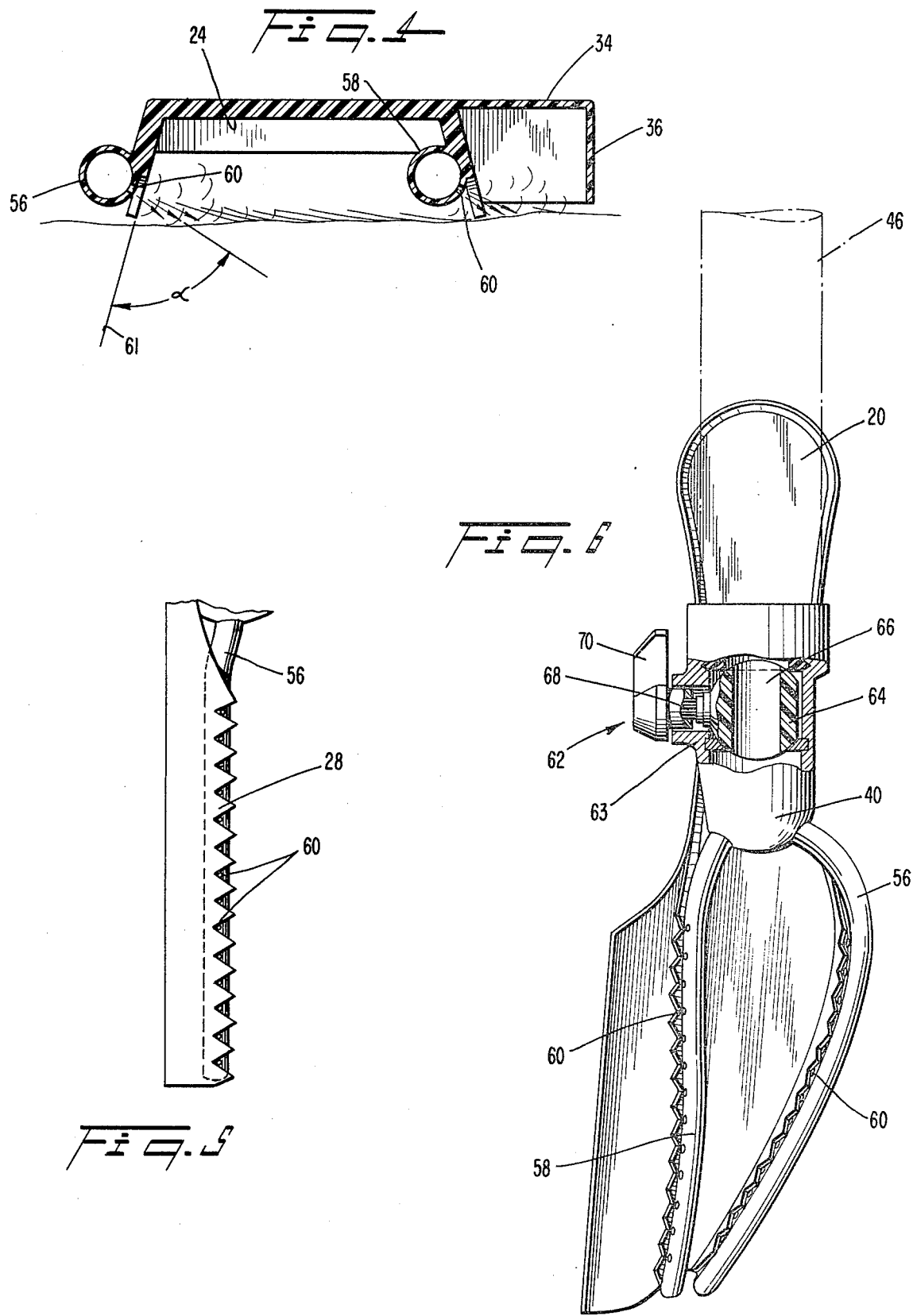

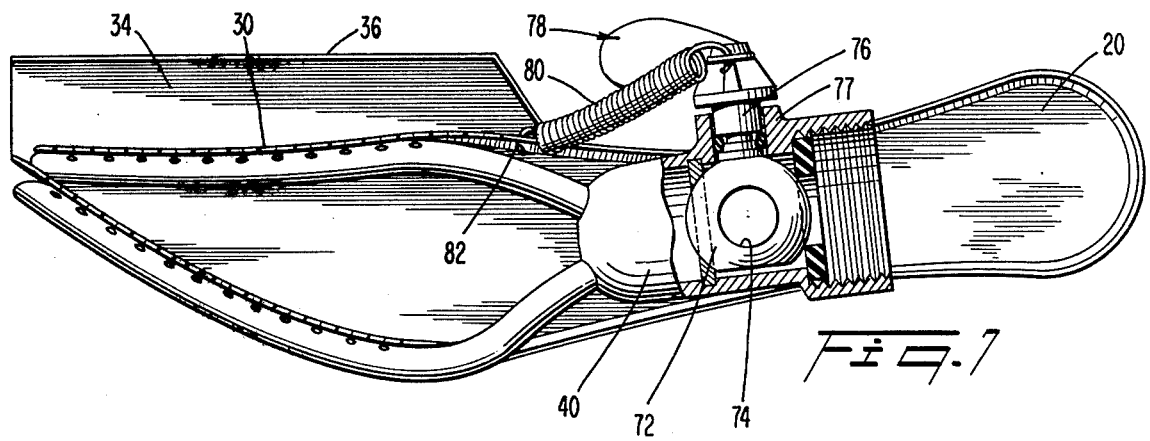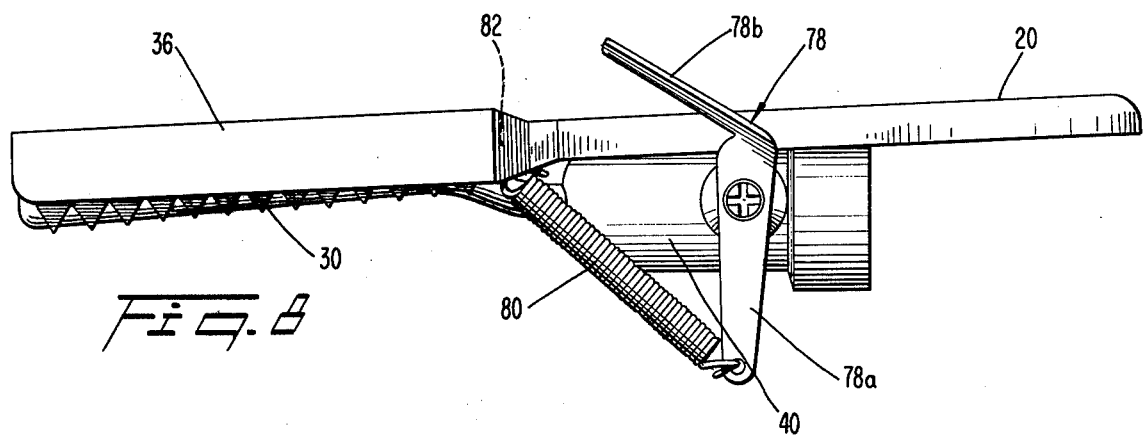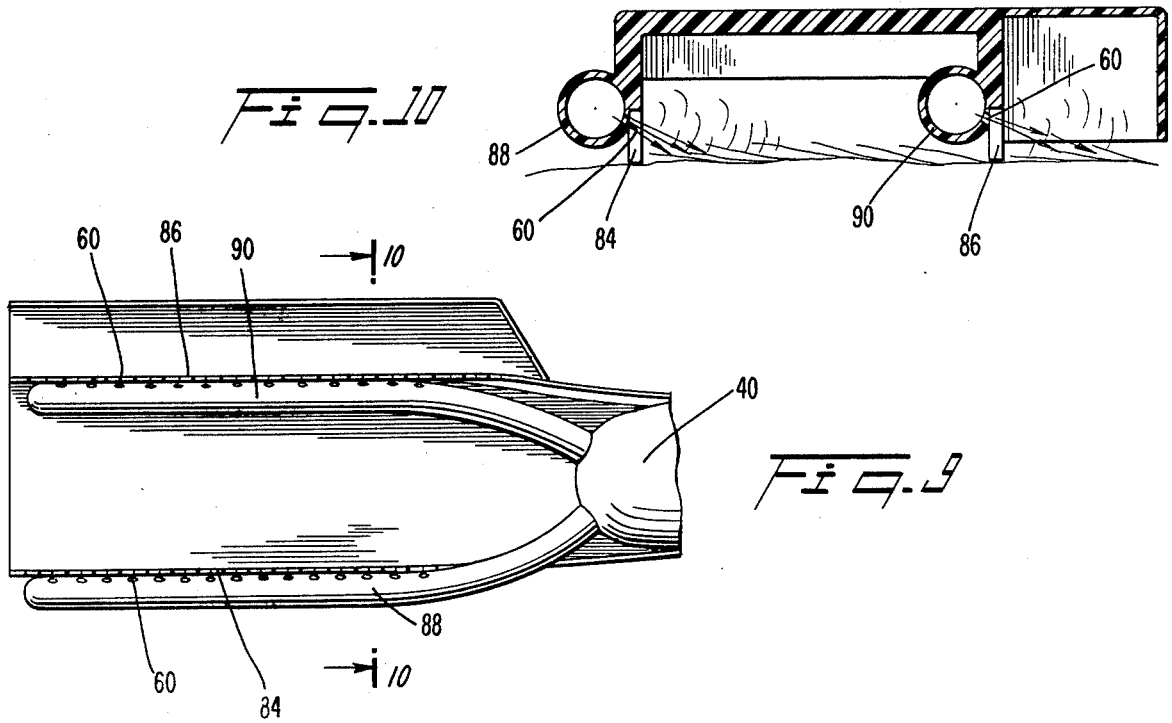

FISH SCALER

BACKGROUND AND SUMMARY OF THE PRESENT INVENTION

The invention disclosed herein pertains generally to fish scalers, and more particularly to hand held devices for cleaning a fish by removing scales from the fish.

Various hand-held devices are known for cleaning fish, including the removal of scales. Typically, such devices include a handle and a scraping element connected to the handle, with the scraping element having a plurality of serrated teeth. In use, one removes the scales from a fish by scraping the surface of the fish with the serrated teeth of the scraping element.

Two prior art hand-held fish cleaning devices having apparatus for cleaning the scraping elements are disclosed in U.S. Pat. No. 3,667,086 issued to Sexton and U.S. Pat. No. 2,884,658 issued to Johnson.

The Sexton patent (U.S. Pat. No. 3,667,086) discloses a hand held fish scaling device wherein a scaling blade is constantly washed with water. This scaling device has a handle with a longitudinal passage extending throughout the length of the handle. Connected to a front end of the handle is an elongate mounting member which has recesses both in its upper surface and in its sides. A scraping element having serrated teeth, and a hood structure are both removably connected to an upper surface of the elongate mounting member. In use, water flows through the passage in the handle and into the recesses in the elongate mounting member to wash the scraping element during a scraping operation.

The Johnson patent (U.S. Pat. No. 2,884,658) discloses a hand held device for removing the outer layer of skin of a precooked, eviscerated fish rather than the scales of a fish. This device includes a hob with bristles or knives attached to its outer surface, which hob is rotated by an air motor. In operation, angled jets of air, coming from a tubular member having angularly directed perforations, are used to keep the hob clean.

In general, fish cleaning (and the removal of fish scales from the surface of a fish) is considered an unpleasant task. The unpleasantness results because fish cleaning is often an inefficient process wherein the same scales need to be scraped more than once before they are removed from the body of the fish. In addition, the scraping of the fish must be intermittently stopped to brush or wash away the loose scales and debris produced during a scrapingg operation. This cleaning action typically prolongs the time needed to scale the fish. Furthermore, an unpleasant fishy odor emanating from the fish must be endured during the fish scaling operation.

Accordingly, a primary object of the present invention is to provide an apparatus for efficiently cleaning a fish by hand.

A further object of the present invention is to provide a hand-held apparatus for removing the scales from a fish while simultaneously washing the fish with water.

Apparatus for removing the scales from a fish, according to the present invention, includes a handle and a scraping element connected to said handle. The scraping element includes at least one row, and preferably two rows of serrated teeth projecting from a front surface of the scraping element, as well as a bracket which channels water, loose scales, and debris in a direction away from a person holding the handle. A relatively large water carrying tube is affixed to the handle. Projecting from a rear end of the water carrying tube is an internally threaded tubular member to which a water conduit may be connected. A valve in the water carrying tube permits a user to regulate the flow of water through the tube.

Projecting from a front end of the relatively large water carrying tube are two relatively small tubes, each of which is positioned on the scraping element adjacent one of the two rows of serrated teeth. Each of these small tubes has angled holes from which jets of water issue to wash the fish being scraped. These jets of water are angled so as to strike the scales of a fish before the scales are engaged by the serrated teeth.

The present invention is advantageous because the jets of water issuing from the two small tubes wash the fish during the scraping operation, avoiding the need to intermittently stop the scraping operation to brush away loose scales and debris. In addition, the washing of the fish prevents loose scales and debris from accumulating between the teeth of the scraping element, avoiding the need to clean the teeth.

The present invention is also advantageous because the jets of water issuing from the two small tubes act in cooperation with the serrated teeth to increase the efficiency of the scaling operation. That is, as the jets of water strike the surface of the fish, they tend to lift the scales from the body of the fish before the scales are engaged by the serrated teeth. Thus, just one pass of the serrated teeth over a fish scale is often sufficient to remove that scale from the body of the fish.

BRIEF DESCRIPTION OF THE DRAWINGS

Preferred embodiment of the present invention are described with reference to the accompanying drawings wherein like members bear like reference numerals and wherein:

FIG. 4 is a transverse, cross-sectional view of the first embodiment of apparatus, taken on the line 4—4 of FIG. 2, showing angled jets of water issuing from the apparatus;

FIG. 5 is a top view of a portion of the first embodiment of apparatus, showing a row of serrated teeth and a tube with angled holes arranged adjacent said row of teeth;

FIG. 6 is a front view, partially in cross-section, of a second embodiment of apparatus, according to the present invention;

FIG. 7 is a front view, partially in cross-section, of a third embodiment of apparatus, according to the present invention;

FIG. 8 is a top view of the embodiment shown in FIG. 7;

FIG. 9 is a front view of a fourth embodiment of apparatus according to the present invention; and FIG. 10 is a cross-sectional view of the embodiment shown in FIG. 9, taken on the line 10—10.

DETAILED DESCRIPTION OF THE PREFERRED EMBODIMENTS

Figure 1:
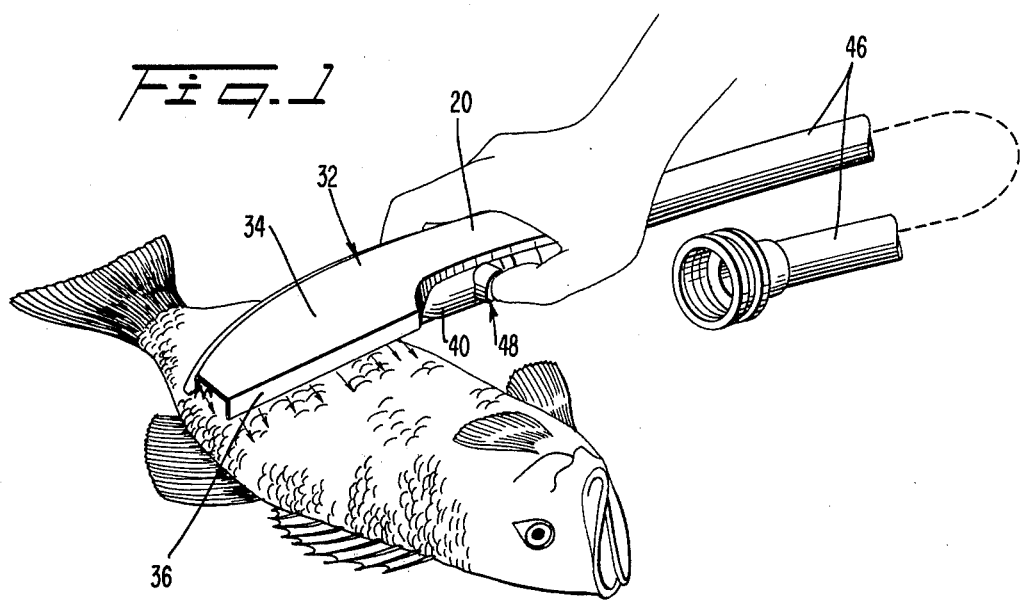
FIG. 1 is a perspective view of a first preferred embodiment of the present invention, illustrating the manner in which a fish is cleaned.

With reference to FIG. 1, a first embodiment of a hand-held fish scaler, according to the present invention, is used to scale and clean a fish by grasping a handle of the fish scaler, and by passing a portion of the fish scaler, from which portion rows of serrated teeth project, over a body of the fish. By depressing a button valve of the fish scaler, which button valve regulates a flow of water through tubes connected to the fish scaler, the body of the fish is struck by angled jets of water emanating from holes in the tubes, as the fish is scraped by the serrated teeth.

Figure 2:
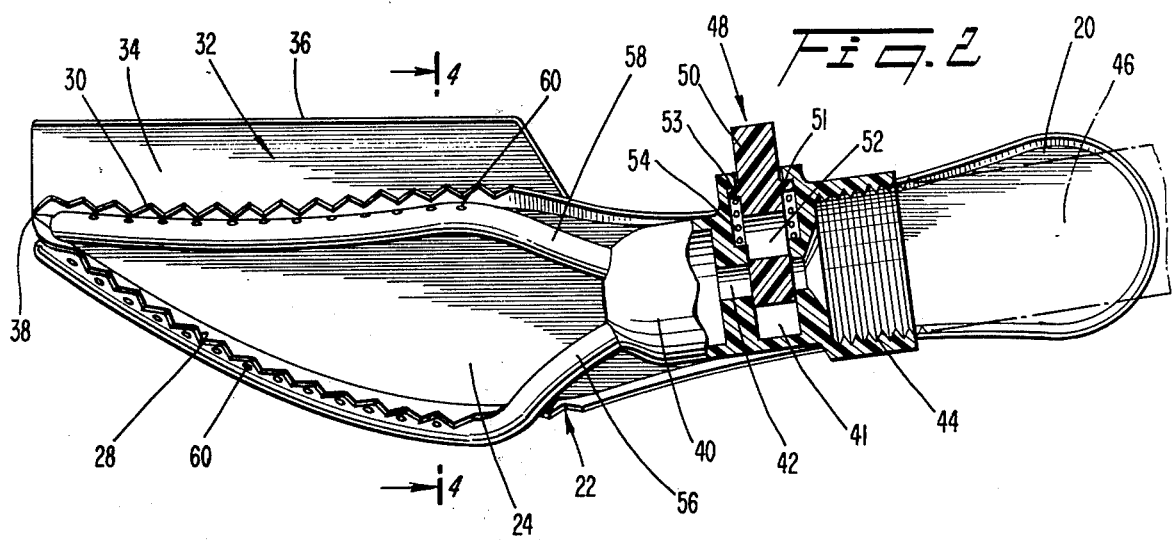
FIG. 2 is a front view, partially in cross-section, of the first embodiment of apparatus according to the present invention.

With reference to FIG. 2 the first embodiment of a hand-held fish scaler according to the present invention includes a handle 20 and a scaper member 22 connected to said handle. Moving from right to left, the width of the scraper member first increases and then decreases to a point 38.

The scraper member 22 includes first and second curved rows of serrated teeth 28, 30, respectively, projecting from a front surface 24 of the scraper member 22. The transverse distance between the rows of serrated teeth 28, 30 varies in a fashion similar to the width variation of the scraper member 22, i.e., this distance first increases as one moves from right to left and then decreases to a point. These rows of serrated teeth extend over substantially the entire length of the scraper member 22.

Figure 3:
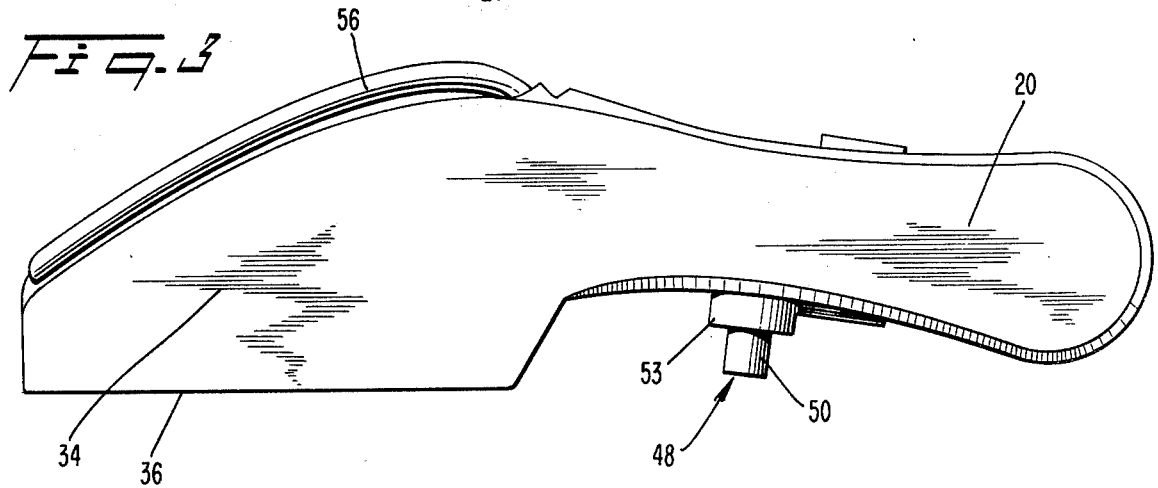
FIG. 3 is a rear view of the first embodiment of apparatus, according to the present invention.

A bracket 32 is connected to a back surface (not shown) of the scraper member 22. The bracket 32 includes a first panel 34 (see FIG. 3) which is connected to the back surface of the scraper member 22. The shape of the panel 34 is substantially the same as that of the scraper member 22 but the width is uniformly greater. The bracket 32 also includes a second generally L-shaped panel 36, connected to said first panel 34, which panel 36 is spaced from and substantially perpendicular to the front surface 24 of the scraper member 22. The length of each of the panels 34 and 36 is approximately equal to the length of the scraper member 22. The width of the panel 36 is substantially equal to the height of the serrated teeth 28, 30 projecting from the front surface 24 of the scraper member 22.

A relatively large tube 40, which is capable of conducting water and other liquids though a central, longitudinal passageway 42, is connected to the handle 20. This tube 40 is arranged so that a longitudinal axis of the tube 40 is substantially parallel to a longitudinal axis of the handle 20. The length of this tube 40 is less than the length of the handle 20, while the outside diameter of the tube 40 is approximately equal to the width of the handle 20. Projecting from a rear end of the tube 40 is an internally threaded tubular member 44 which permits a water conduit 46, having a male fitting, to be coupled to the tube 40.

Embedded within the tube 40, adjacent to the tubular member 44, is a button valve 48. The button valve 48 includes a cylinder 50, and a cylindrical collar 51 connected to an upper portion of the cylinder 50. The cylinder 50 includes a radially transverse aperture 52 extending through the cylinder, i.e., an aperture with a longitudinal axis which is substantially perpendicular to a longitudinal axis of the cylinder 50. A length of the aperture 52 is equal to a diameter of the cylinder 50.

The cylinder 50 is arranged within a radially transverse aperture 41 in the tube 40. An upper portion of the aperture 41 has a greater diameter than a lower portion, with the juncture between these portions defining a cylindrical shoulder. The upper portion of the cylinder 50 to which the cylindrical collar 51 is connected, is arranged within the upper portion of the aperture 41.

Both the longitudinal axis of the cylinder 50 as well as a longitudinal axis of the aperture 41 are substantially perpendicular to the longitudinal axis of the tube 40. On the other hand, the longitudinal axis of the aperture 52 is substantially parallel to the longitudinal axis of the tube 40.

A tubular collar 53, projecting from an outer surface of the tube 40, encompasses a portion of the cylinder 50 which projects outside the outer surface of the tube 40. An inner surface of this tubular collar 53 coincides with the upper portion of the aperture 41. An inwardly projecting lip encircles the mouth of the collar 53 to define an internal cylindrical shoulder between the lip and the mouth of the collar.

A cylindrical spring 54 is arranged within the upper portion of the aperture 41. A lower end of the spring 54 is seated on the cylindrical shoulder defined by the juncture between the upper and lower portions of the aperture 41. An upper end of the spring 54 presses against the collar 51, connected to the cylinder 50, urging the collar 51 upwardly to seat itself on the cylindrical shoulder at the mouth of the collar 53. By urging the collar 51 upwardly the spring 54 biases the aperture 54 in the cylinder 50 out of alignment with the central passageway 42 in the tube 40. By depressing the cylinder 50 the aperture 52 may be aligned with the central passageway 42.

Projecting from a front end of the tube 40 are two tubes, 56 and 58, which are smaller in diameter than tube 40. These tubes are affixed to the front surface 24 of the scraper member 22. The tube 56, which has a shaped conforming to that of the first curved row 28 of serrated teeth, lies adjacent said row 28. Similarly, the tube 58 has a shape conforming to that of the second curved row 30 of serrated teeth and lies adjacent said row 30.

The two tubes 56 and 58 each have a plurality of transverse holes 60 which extend from exterior surfaces of these tubes to the interiors of these tubes. These holes 60 are canted or angled. Thus when the water conduit 46 is connected to the tube 40, and the button valve 48 depressed, angled jets of water issue from the holes 60.

With reference to FIG. 4, each of the holes 60, as well as each jet of water issuing from each of the holes 60, makes an angle, $\alpha$, with respect to a tangent or to a surface of a serrated tooth adjacent the jet of water, of between 0 and 90 degrees. Preferably, the angle $\alpha$ is between 30 and 60 degrees, and more preferably the angle $\alpha$ is 45 degrees. Because of uncertainties in the manufacturing process it is unlikely that each of the holes 60 can be canted to a precise angle of 45 degrees. But an angle of between 30 and 60 degrees is considered adequate and desirable for the purposes of the invention.

With reference to FIG. 5, the row of serrated teeth 28 is positioned adjacent the tube 56. As shown in this figure each of the angled holes 60 in the tube 56 is interdigitated between two teeth of the row of teeth 28. The positional relationships between the row of teeth 30, the tube 58, and the holes 60 in the tube 58, are analogous to that shown in FIG. 5.

With reference to FIG. 6, a second embodiment of apparatus, according to the present invention, is essentially identical to the first embodiment but differs in that a lever actuated ball valve 62 is used in place of a button valve. The ball valve 62 includes a rotatable sphere 64 which is embedded in the relatively large water carrying tube 40, which tube 40 is connected to the handle 20. The sphere 64 includes a cylindrical aperture 66 extending through a center of the sphere. A cylinder 68 is connected to a top portion of the sphere 64 and projects from an interior of the tube 40. The cylinder 68 is partially encased by a collar 63 which projects from an outer surface of the tube 40. A turning lever 70 is connected to a top portion of the cylinder 68. By rotating the lever 70 in one of two directions the cylindrical aperture 66 in the sphere 64 may be either rotated into alignment with, or rotated out of alignment with, the central passageway 42 in the tube 40.

With reference to FIGS. 7 and 8, a third embodiment of apparatus, according to the present invention, is generally similar to the second embodiment, and also includes a ball valve 70. As before, the ball valve 70 includes a rotatable sphere 72 which is embedded in the relatively large water carrying tube 40, which tube is connected to the handle 20. The sphere 72 includes a cylindrical aperture 74 extending through a center of the sphere. A cylinder 76 is connected to a top portion of the sphere 72. The cylinder 76 projects from an interior of the tube 40, and is partially encased by a collar 77 which projects from an outer surface of the tube 40. A two-pronged turning lever 78, which turning lever includes prongs 78a and 78b, is connected to a top portion of the cylinder 76.

The third embodiment of apparatus further includes a spring 80, one end of which spring is connected to one of the prongs 78a of the lever 78, and the other end of which spring is connected to a portion 82 of the scraper member 22. The spring 80 urges the prong 78a of the turning lever 78 to point toward the scraper member 22, rather than toward the handle 20. As a consequence, the cylindrical aperture 74 in the sphere 72 is biased out of alignment with the central passageway 42 in the tube 40. By rotating the prong 78b of the lever 78 toward the scraper member 22, which action results in a tensioning of the spring 80, the sphere 72 is rotated so as to bring the cylindrical aperture 74 into alignment with the central passageway 42 in the tube 40.

With reference to FIGS. 9 and 10, a fourth embodiment of apparatus according to the present invention includes two linear rows of serrated teeth 84 and 86 rather than curved rows of teeth, which linear rows of teeth are connected to the scraper member 22. A straight tube 88 with canted holes 60, is positioned adjacent the straight row of teeth 84, while a straight tube 90 also having canted holes 60, is positioned adjacent the straight row of teeth 86. In all other respects this fourth embodiment may be identical to either the first, second, or third embodiments discussed above.

It is to be noted that although the embodiments of the present invention depicted in the figures and described above are more conveniently used by right-handed individuals, they may also be used by left-handed individuals. Furthermore, the embodiments described above may be readily redesigned so that they may be more conviently used by left-handed individuals.

The materials used to manufacture the embodiments of the invention described above may be either metal or plastic or any other suitable material. That is, the handle 20, the scraper member 22, and the bracket 32 may be of metal or plastic or any other suitable material. Similarly, the relatively large water-carrying tube 40 connected to the handle 20, and the two relatively small tubes 56 and 58 connected to the scraper member 22, may be of metal or plastic or any other suitable material.

The way in which one uses the first embodiment of the invention described above to scale and clean a fish is shown in FIG. 1. After coupling one end of the water conduit 46 to the tube 40, and the other end of the water conduit to a source of pressurized water, a user grasps the handle 20 with one hand. The embodiment shown in FIG. 1 is more readily grasped with the right hand. The user then places the rows of serrated teeth 28, 30 against the surface of a fish, and passes the serrated teeth over the surface of the fish toward the user's body. Simultaneously the user depresses the button valve 48 with the thumb of his hand to permit angled jets of water from the canted holes 60 in the tubes 56 and 58 to strike the fish. The angled jets of water tend to lift the fish scales before the scales are engaged by the serrated teeth of the fish scaler, making it possible to remove the scales with just one stroke of the serrated teeth. The water also washes the surface of the fish, thereby removing loose scales and debris from the surface of the fish, and thus tending to prevent the spaces between the serrated teeth 28, 30 from becoming clogged with such loose scales and debris. The bracket 32 channels water, loose scales, and debris away from the user and away from the fish.

The way in which one uses the other embodiments of the invention is similar to the way in which one uses the first embodiment. The only difference in the use of the second and third embodiments of the invention, from the first embodiment, is that one must rotate the apertures in the ball valves used in these embodiments into alignment with the central passageway 42 in the tube 40 in order to permit jets of water to issue from the angled holes 60.

In a series of experiments a first half of a fish was scaled using a conventional hand held fish scaler not having a water flushing feature, and a second half of the fish was scaled using a device according to the present invention. The time required to scale the first half of the fish was between 15 and 25 seconds while the time required to scale the second half of the fish was between 5 and 12 seconds. The variation in these results is due to the different types of fish used in the experiments, as well as to variations in the sizes of the holes 60 used in the tubes 56 and 58 and to the difficulty in reproducing the manual operation of the fish scaling devices.

An interesting observation result of the above experiments is that fish cleaned with the present invention emerges with substantially no fishy odor at all, whereas a fish cleaned with a conventional scraper continues to exude a fishy oder especially during cooking. It is conjectured that the fishy odor is produced by a mucus secreted by fish, which mucus is presumably washed away by the jets of water emanating from the holes 60 in the tubes 56 and 58 during the fish scaling operation.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for scaling a fish comprising:
   first hand-held means for detaching scales from a surface of a fish; and
   second means, connected to said first means, for washing the fish with at least one angled jet of liquid, which at least one jet of liquid lifts the scales from the surface of the fish immediately before said scales are detached from the surface of the fish by said first means.

2. Apparatus in accordance with claim 1 wherein said first hand-held means includes:
   a handle; and
   a scraper member, connected to said handle, which scraper member includes a bottom surface and a top surface with at least one row of serrated teeth projecting from said top surface.

3. Apparatus in accordance with claim 2 wherein said first hand-held means further includes guard means for deflecting liquid, fish scales, and debris, produced while scaling a fish, away from the fish, said guard means being connected to said scraper member.

4. Apparatus in accordance with claim 3 wherein said guard means includes a bracket having a first portion connected to the bottom surface of the scraper member, and a second portion which is spaced from, and substantially perpendicular to, said top surface of the scraper member.

5. Apparatus in accordance with claim 2 wherein the at least one row of serrated teeth is substantially linear.

6. Apparatus in accordance with claim 2 wherein the at least one row of serrated teeth is curved.

7. Apparatus in accordance with claim 2 wherein said second means includes:
   a first tube connected to the handle;
   coupling means, connected to a rear end of said first tube, for coupling a source of pressurized liquid to said first tube;
   valve means for regulating a flow of the liquid through said first tube; and
   at least one second tube, projecting from a front end of said first tube and positioned adjacent the at least one row of serrated teeth on the second surface of the scraper member, said second tube having a plurality of holes extending from an outer surface to an interior of said second tube to permit a jet of liquid to issue from each of said holes when said source of liquid is coupled to said first tube.

8. Apparatus in accordance with claim 7 wherein each hole in the second tube makes an angle with respect to a tangent to a surface of a serrated tooth adjacent the hole of between 0 and 90 degrees.

9. Apparatus in accordance with claim 8 wherein said angle is between 30 and 60 degrees.

10. Apparatus in accordance with claim 8 wherein said angle is substantially 45 degrees.

11. Apparatus in accordance with claim 7 wherein said valve means includes a button valve.

12. Apparatus in accordance with claim 7 wherein said valve means includes a ball valve.

13. Apparatus in accordance with claim 4 wherein said handle, said scraper member, and said bracket are of metal.

14. Apparatus in accordance with claim 4 wherein said handle, said scraper member, and said bracket are of plastic.

15. Apparatus in accordance with claim 7 wherein the first tube and the at least one second tube are of metal.

16. Apparatus in accordance with claim 7 wherein the first tube and the at least one second tube are of plastic.

17. A method for scaling a fish comprising the steps of:
   moving a hande-held device having at least one row of serrated teeth longitudinally along a fish to be cleaned;
   directing a plurality of angled jets of liquid ahead of said one row of serrated teeth;
   lifting said scales with said angled jets of liquid whereby said scales may be readily detached from the fish by said serrated teeth; and
   detaching the scales lifted by the angled jets of water with the serrated teeth.

18. The method of claim 17 further comprising the step of directing the liquid and debris produced during the scaling of the fish away from the fish.

19. Apparatus in accordance with claim 2 wherein said at least one angled jet of liquid emanates from a point behind said row of serrated teeth to strike the surface of said fish at a point in front of said row of serrated teeth.

20. Apparatus for scaling a fish comprising:
   a handle;
   means for detaching scales from a surface of a fish, which means is connected to said handle, and which means includes at least one row of serrated teeth;
   said handle including conduit means for conducting a flow of pressurized water;
   connection means for selectively connecting said conduit means to a source of pressurized water;
   said conduit means including orifice means for directing said flow of pressurized water obliquely with respect to said surface of said fish to lift the scales from the surface of said fish immediately before said scales are detached from the surface of the fish by said at least one row of serrated teeth.

21. Apparatus in accordance with claim 20, wherein said means for detaching scales includes at least two generally parallel rows of serrated teeth.

* * * * *